United States Patent
Hahn et al.

(10) Patent No.: US 8,441,761 B1
(45) Date of Patent: May 14, 2013

(54) HARD DISK DRIVE SUSPENSION WITH REDUCED PSA CHANGE DUE TO HUMIDITY AND TEMPERATURE VARIATIONS

(75) Inventors: Peter Hahn, Wildomar, CA (US); Wei Keat Chai, San Jose, CA (US); Kuen Chee Ee, Chino, CA (US)

(73) Assignee: Magnecomp Corporation, Murrieta, CA (US)

( * ) Notice: Subject to any disclaimer, the term of this patent is extended or adjusted under 35 U.S.C. 154(b) by 227 days.

(21) Appl. No.: 12/983,613

(22) Filed: Jan. 3, 2011

(51) Int. Cl.
*G11B 5/60* (2006.01)
*G11B 21/21* (2006.01)

(52) U.S. Cl.
USPC .................................... 360/245.9; 360/245.3

(58) Field of Classification Search ............... 360/244.3, 360/245.8, 245.9, 245.3
See application file for complete search history.

(56) References Cited

U.S. PATENT DOCUMENTS

| | | | |
|---|---|---|---|
| 5,598,307 A * | 1/1997 | Bennin | 360/245.9 |
| 5,796,556 A | 8/1998 | Boutaghou | |
| 5,805,381 A * | 9/1998 | Resh | 360/245.5 |
| 5,818,662 A | 10/1998 | Shum | |
| 5,844,751 A * | 12/1998 | Bennin et al. | 360/244.3 |
| 5,864,445 A | 1/1999 | Bennin et al. | |
| 5,982,584 A | 11/1999 | Bennin et al. | |
| 6,125,015 A * | 9/2000 | Carlson et al. | 360/245.9 |
| 6,381,100 B1 | 4/2002 | Bennin et al. | |
| 6,515,832 B1 | 2/2003 | Girard | |
| 6,612,016 B1 | 9/2003 | Bennin et al. | |
| 6,741,425 B1 | 5/2004 | Wu et al. | |
| 7,152,303 B2 | 12/2006 | Childers et al. | |
| 7,518,830 B1 * | 4/2009 | Panchal et al. | 360/245.8 |
| 7,545,605 B2 | 6/2009 | Hagiya et al. | |
| 8,064,169 B2 * | 11/2011 | Higashi et al. | 360/245.9 |
| 8,154,827 B2 * | 4/2012 | Contreras et al. | 360/264.2 |
| 2005/0280944 A1 * | 12/2005 | Yang et al. | 360/245.9 |
| 2009/0109568 A1 | 4/2009 | Hernandez et al. | |
| 2011/0149443 A1 * | 6/2011 | Contreras et al. | 360/245.8 |

FOREIGN PATENT DOCUMENTS

| | | | |
|---|---|---|---|
| JP | 10247310 A | * | 9/1998 |
| JP | 10270817 A | * | 10/1998 |
| JP | 2008251121 A | * | 10/2008 |

* cited by examiner

*Primary Examiner* — Will J Kilmowicz
(74) *Attorney, Agent, or Firm* — Intellectual Property Law Offices of Joel Voelzke, APC

(57) ABSTRACT

In a disk drive suspension circuit, in order to improve stability of the stable pitch static attitude (PSA) over changes in humidity, the suspended portion of the flexible circuit and/or the gimbal support arm are modified to change their response(s) to humidity. In one embodiment, hygroscopic material such as the material of the insulating layer are added to the stainless steel gimbal support arm, so that in response to humidity it bends in the opposite direction as the suspended portion of the circuit. In another embodiment, additional hygroscopic material is added to the circuit, and/or the polyimide insulating layer or the coverlayer are selectively removed, so that the net bend in the suspended portion of the circuit over humidity is reduced, ideally to a condition of zero or close to zero net bending.

13 Claims, 12 Drawing Sheets

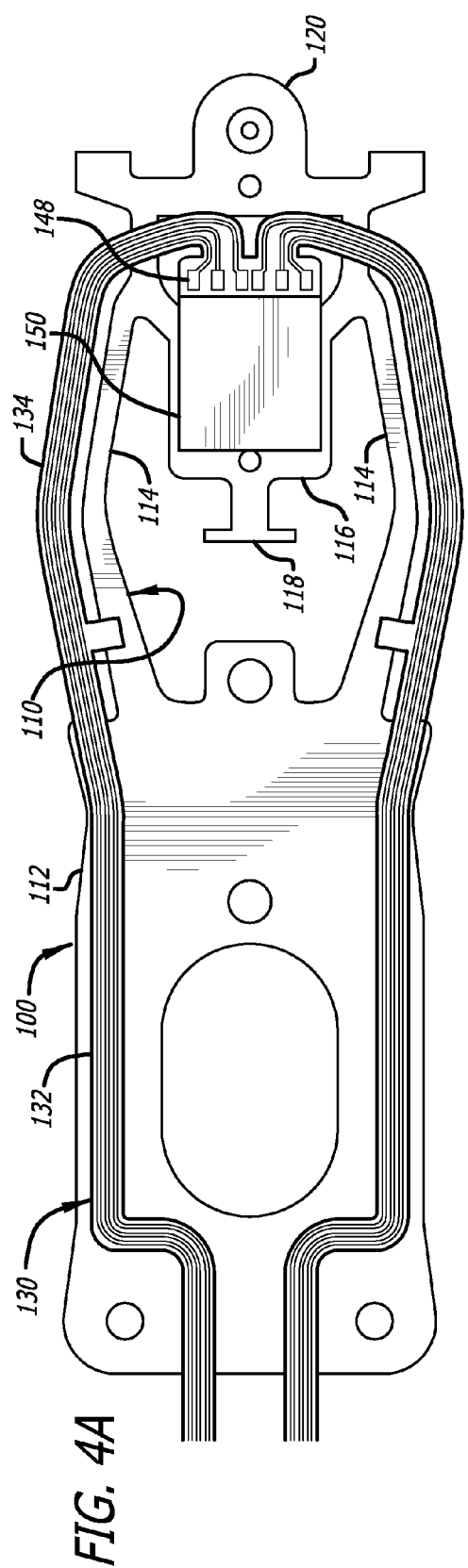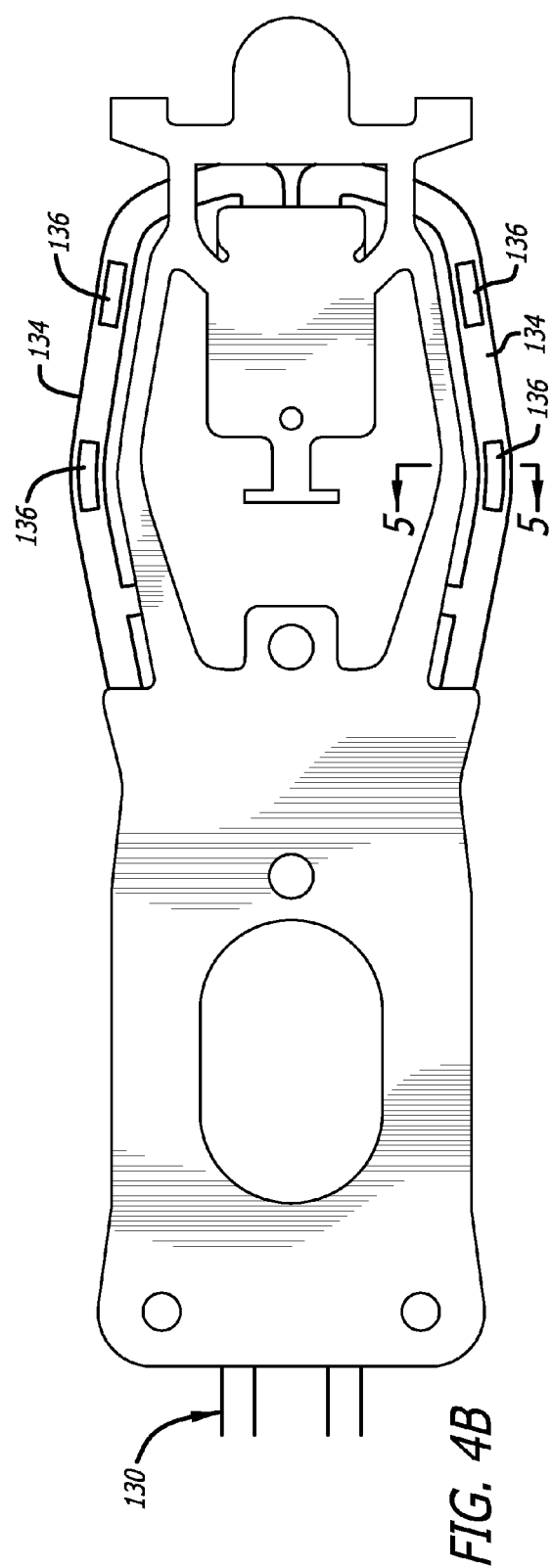
FIG. 4A
FIG. 4B

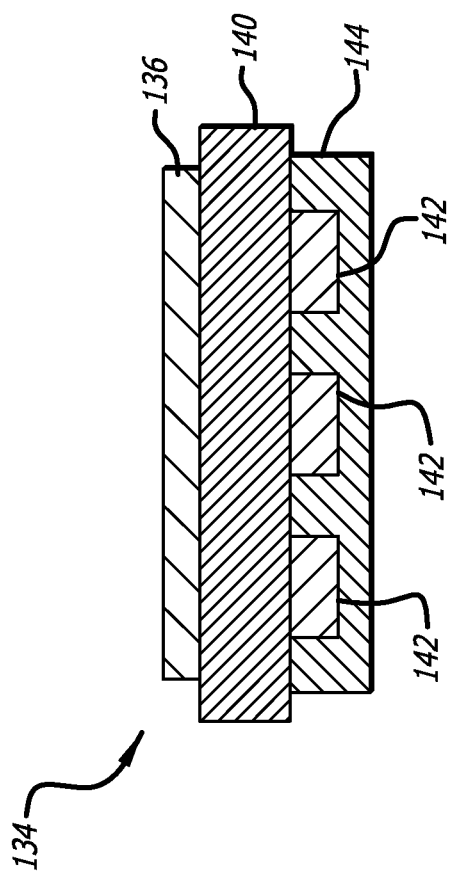
FIG. 5A
FIG. 5B

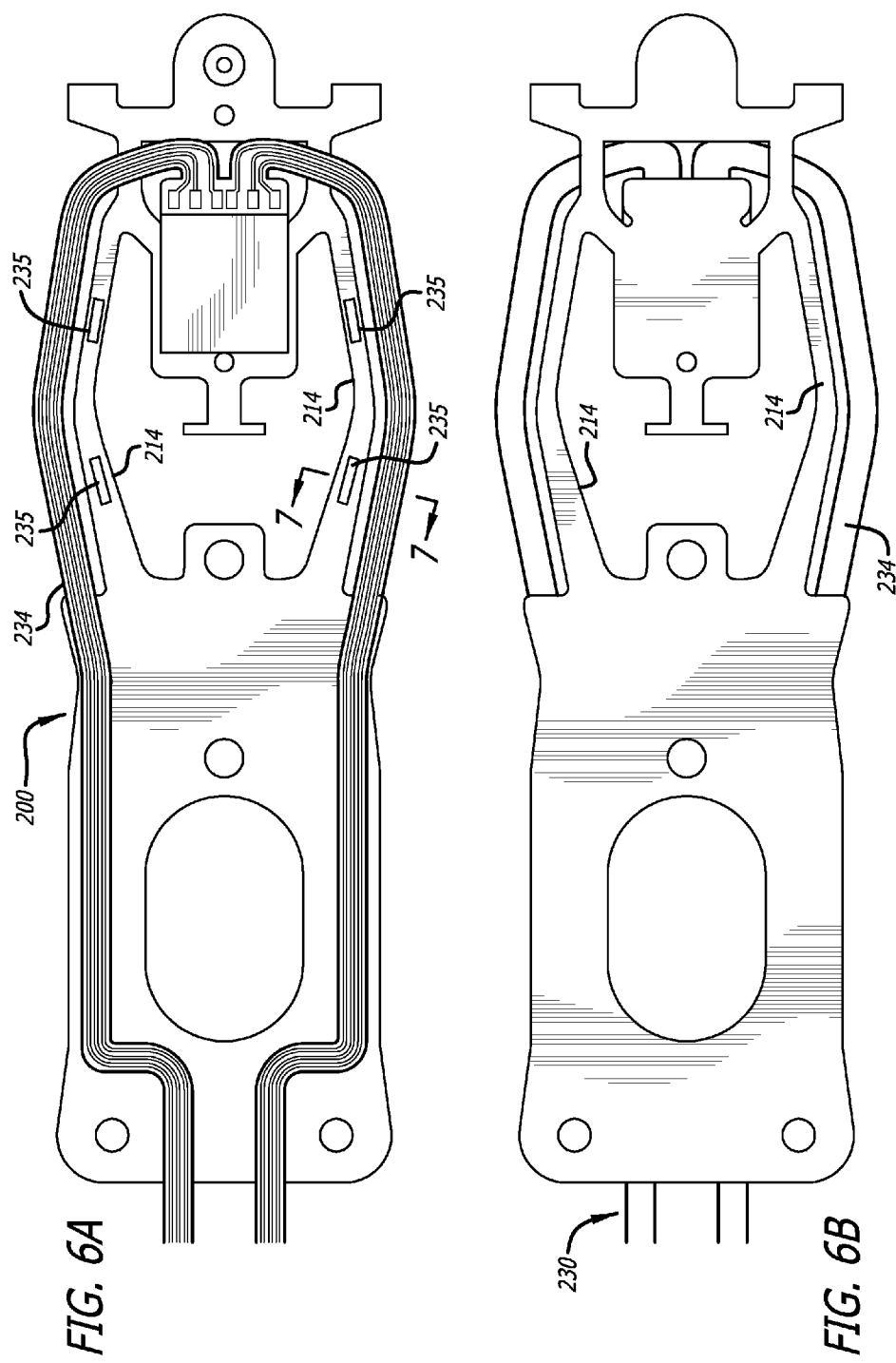

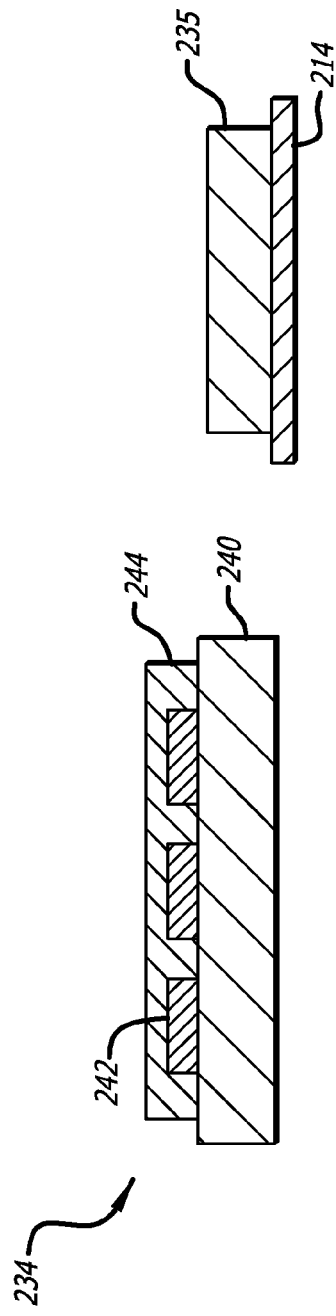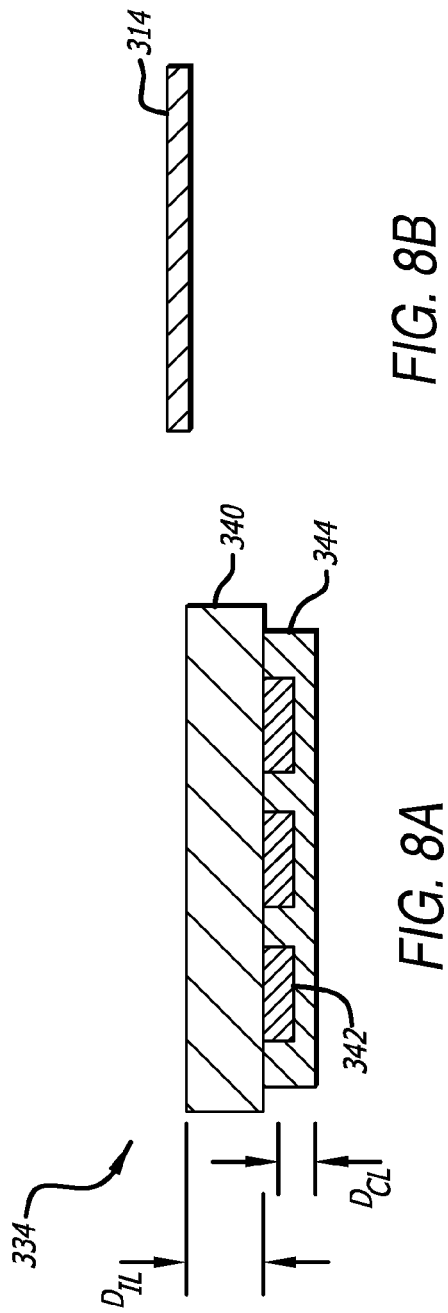

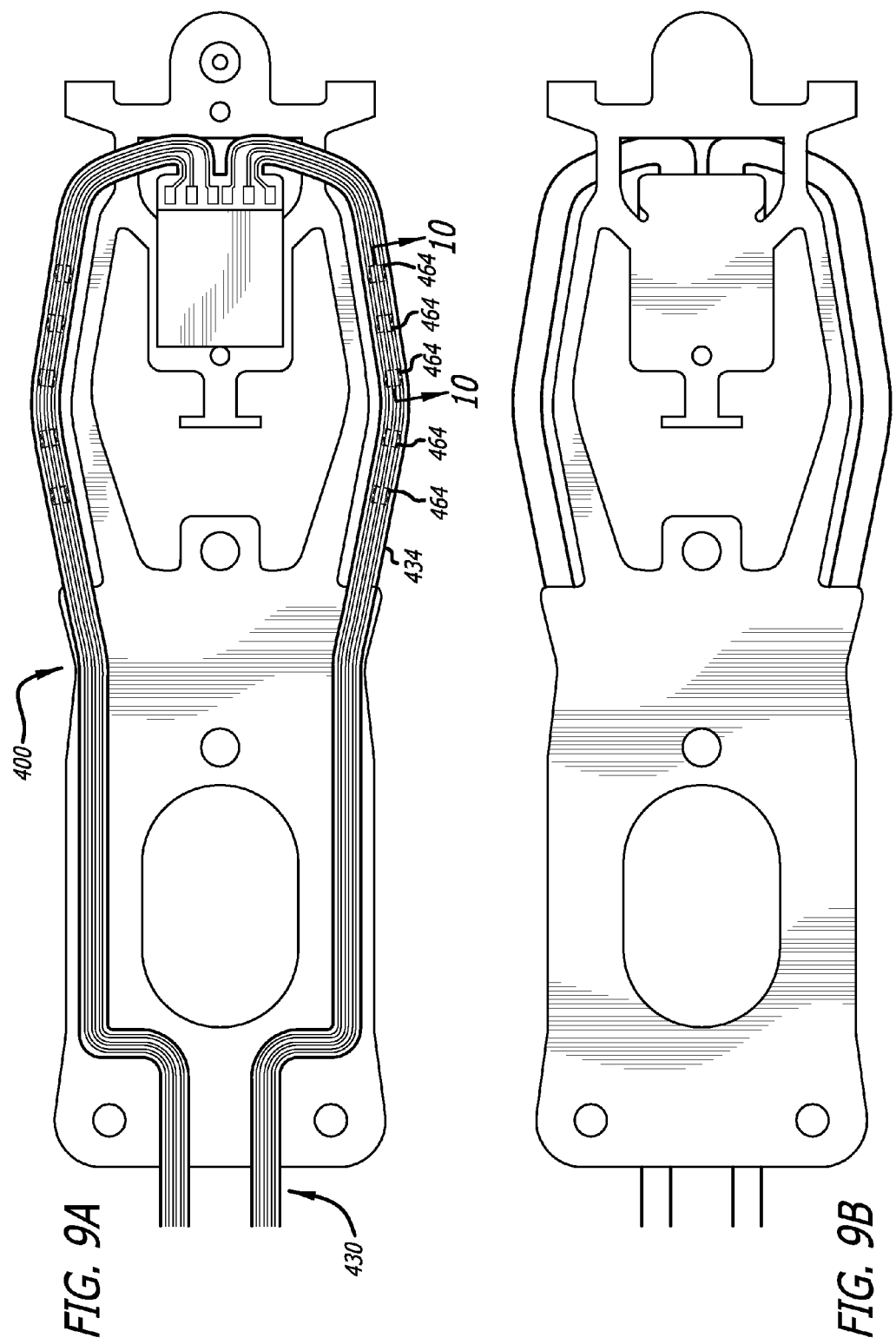

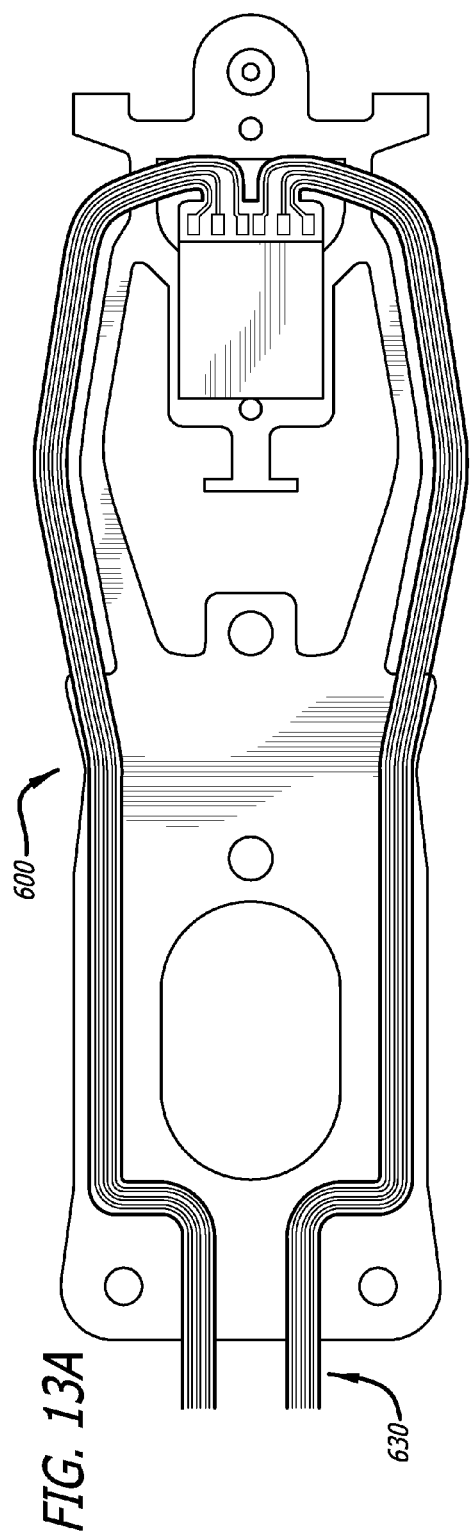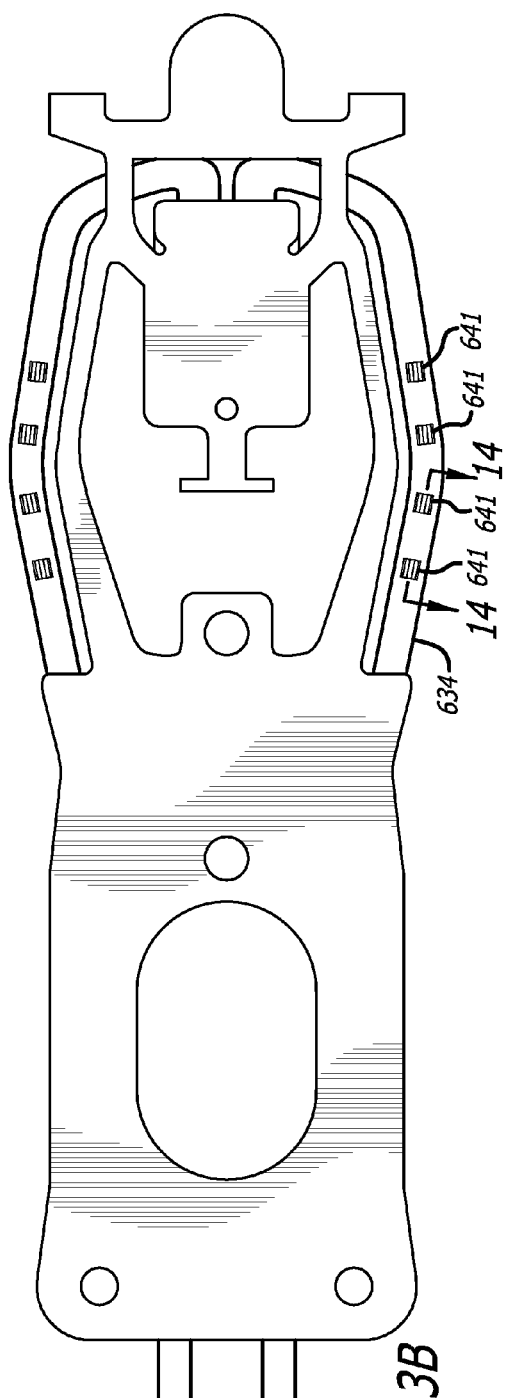

HARD DISK DRIVE SUSPENSION WITH REDUCED PSA CHANGE DUE TO HUMIDITY AND TEMPERATURE VARIATIONS

CROSS-REFERENCE TO RELATED APPLICATIONS

None

BACKGROUND OF THE INVENTION

1. Field of the Invention

This invention relates to the field of Disk Drive Suspensions. More particularly, this invention relates to the field of a Hard Disk Drive Suspension resistant to Pitch Static Attitude (PSA) changes due to variations in humidity and temperature.

2. Description of Related Art

FIG. 1 shows a typical magnetic hard disk drive (HDD) 10, such as is known in the prior art and to which the present invention may be applied. The HDD 10 generally uses a spinning storage medium 12 (e.g., a disk or platter) to store data. A suspension 14 is mounted to a support arm or actuator arm 16, which is rotated by a voice coil motor (not shown).

As data densities and hence data track densities increase in response to consumer demands for more and more storage, it becomes increasingly important to keep the head slider which is mounted at the end of the suspension 14 over the correct portion of disk 12, and aligned with the proper pitch and roll attitude. The pitch and roll attitude of a suspension including its head slider when not interacting with a spinning disk is called the pitch static attitude (PSA) of the suspension. The PSA of a suspension is typically finely adjusted at the time of its manufacture to the desired PSA. Any changes in the PSA over come time from the factory-adjusted PSA can adversely effect the disk drive's performance. In an extreme case, a drastic PSA change could result in disastrous failure of the disk drive.

Suspensions typically have a stainless steel support substrate or support layer, and a flexible circuit that typically includes an insulating layer such as polyimide, a plurality of copper or copper-alloy (hereafter, simply "copper") conductive metal signal traces to carry data read-write signals between the head slider and pre-amplifiers that are located off the suspension, a gold layer over the copper signal traces, and an insulating protective coverlayer such as acrylic or polyimide over the circuit to protect against oxidation and short circuiting of the signal traces.

One problem with prior art suspensions is the sensitivity of the PSA due to changes in temperature and humidity. The materials used for the insulating layer, which is typically polyimide, and for the coverlayer, are typically hygroscopic, meaning that they absorb water from the atmosphere. When those materials absorb water from the atmosphere they expand, and when they release water to the atmosphere they contract. In contrast, the metal support layer of the suspension, which is typically stainless steel, and to which parts of the circuit are laminated or otherwise adhered, is non-hygroscopic. The copper signal traces are also non-hygroscopic. When a suspension is exposed to increasing humidity, therefore, the polyimide and the coverlayer expand, while the stainless steel support layer to which it is adhered and the copper signal traces do not expand.

FIGS. 2-3B illustrates this situation. In these figures, a first non-hygroscopic layer 20, such as stainless steel, has a second and hygroscopic layer 22 such as polyimide over it. On top of that is a third and non-hygroscopic layer 24, which could be a copper signal trace. In a relatively dry condition shown in FIG. 2 and in cross section FIG. 3A taken along line 3-3, the structure lies flat.

FIG. 3B shows this structure under increased humidity conditions. In this figure, hygroscopic layer 22 has absorbed moisture from the atmosphere and has volumetrically expanded. Both layers 20 and 24 are non-hygroscopic and have not expanded. The copper layer 24 is thinner, narrower, and softer than stainless steel layer 20, and hence presents less resistance to expansion than does stainless steel layer 20. The result is that the structure bows downward as shown.

When the structure is polyimide on stainless steel with no copper on top, the structure will bow downward as in FIG. 3B. Hard disk drive suspensions typically include flexible circuits that have suspended portions, i.e., portions that comprise copper or copper alloy signal traces on polyimide with no stainless steel support layer below. When the structure is copper on polyimide with no stainless steel below, the structure will bow upward. In general, therefore, in response to increased humidity, a suspension circuit will have areas that bow upward, areas that bow downward, and areas that may be warped and wavy, with the locations and severity of the bowing and warping changing as the humidity changes. The severity of the changes will depend on the differences in the coefficients of hygroscopic expansion of the materials, and the percent humidity change.

A similar bowing and warping effect occurs due to changes in temperature, due to the differences between coefficients of thermal expansion in the materials used.

The ways that a suspension responds to humidity and temperature variations are sometimes referred to as the hygrothermal characteristics of the suspension. Hygrothermal effects negatively affect the PSA of a suspension, and hence the performance of the disk drive.

Various solutions have been proposed to the problem of hygrothermal effects in a suspension.

U.S. Pat. No. 5,982,584 issued to Bennin et al. proposes a suspension in which a first and supported portion of the circuit includes copper on polyimide on stainless steel, and a second and suspended portion of the circuit in serial with the first portion which includes copper on polyimide without any stainless steel, such that in response to increased humidity the first part bends upward and the second part bends down, with the two bendings purportedly counteracting each other.

U.S. Pat. No. 6,381,100 issued to Bennin et al. is similar to Bennin '584 but proposes a parallel solution as opposed to a serial solution. More particularly, Bennin '100 proposes a suspension in which a first and supported portion of the circuit includes copper on polyimide on stainless steel, and a second and suspended portion of the circuit in parallel with the first portion that includes copper on polyimide without any stainless steel, such that in response to increased humidity the first part bends upward and the second part bends down, with the two bendings purportedly counteracting each other.

U.S. Pat. No. 6,515,832 issued to Girard proposes adding distally extending non-water absorbent appendages to the suspension. The appendages resemble copper horns at the distal end of the suspension. The appendages purportedly act as deformation inhibitors.

U.S. Patent Publication No. 2009/0109568 by Hernandez proposes that a head gimbal assembly (HGA) be fabricated such that thermally induced variations in the slider profile (crown) are counterbalanced by controlled thermally induced changes in the PSA of the suspension. In an embodiment, Hernandez's structure includes a thin layer of diamond-like carbon (DLC) as a thermal element that is deposited on the backside of the outriggers of a suspension ring gimbal.

SUMMARY OF THE INVENTION

The present invention provides novel solutions to the problem of hygrothermal effects changing the PSA of the slider over variations in humidity and temperature.

In a first embodiment, the suspended portion of the flexible circuit has one or more added patches of non-hygroscopic material. The non-hygroscopic material could be the same stainless steel material of the support layer for ease of manufacturing. The added patches of stainless steel are isolated patches or islands of stainless steel that are not connected to the stainless steel that defines the support layer. The isolated islands of stainless steel on any particular suspended portion of the flexible circuit cause the suspended portion to bow in the opposite direction as that portion otherwise would bow in the absence of the islands of stainless steel. The suspended portion of the circuit therefore has portions that bow in a first direction, and portions thereof that bow in a second and opposite direction, thereby bending in opposite direction as humidity increases or decreases, with the bowings therefore tending to cancel each other out as the humidity changes. Ideally, the net effect is that the suspended portion of the circuit has no net bowing in either direction as the humidity changes. Advantageously, the suspended portion of the circuit and hence the PSA is less susceptible to changes in temperature as well. The suspension therefore defines a suspension whose PSA has an improved resistance to environmental changes, especially humidity changes.

In a second embodiment, portions of the gimbal such as the gimbal outrigger arms have patches of hygroscopic material such as polyimide added thereto. The polyimide patches may be located where the outrigger arms are generally parallel to suspended portions of the flexible circuit. Preferably, the polyimide patches are isolated island of hygroscopic material that are not connected by any hygroscopic material to the flexible circuit, the islands of hygroscopic material do not extend to any portion of the support layer other than the gimbal arms, the polyimide patches are not part of the flexible circuit, meaning that no copper signal traces extend over or under that polyimide, and the polyimide patches do not directly contact the flexible circuit. As the humidity increases, the added polyimide patches on the stainless steel outrigger arms cause those arms to bow in a first direction, as the adjacent and generally parallel suspended portion of the flexible circuit bows in a second and opposite direction. With the two parallel portions of the suspension bending in opposite directions, the two bending effects tend to cancel each other out, and ideally the net effect is zero or close to zero change in the PSA as the humidity changes.

In a third embodiment, at least part of the suspended portion of the flexible circuit has hygroscopic material on both sides of sufficient thickness and/or percentage of coverage (duty cycle), taking into account any differences in the coefficients of hygroscopic expansion of the different hygroscopic materials involved, such that the total expansion of both sides of the flexible circuit are equal or approximately equal. If the same material is used on both sides, such as polyimide as the insulating layer on the bottom side and polyimide as the coverlayer on the top side, with the copper metal signal traces therebetween, then the thicknesses of both the insulating layer and the insulating layer should be approximately equal, such that as humidity increases the flexible circuit does not bend appreciably in one direction or the other.

In a fourth embodiment, the hygroscopic layer on at least one of the top and the bottom of the suspended portion of the flexible circuit is selectively removed. For example, the coverlayer, which is the top layer of the circuit, is selectively removed such that the coverlayer has a selected duty cycle defined by alternating areas with no coverlayer and areas with a coverlayer. The areas where the coverlayer is removed and the size of those areas are selected such that as humidity increases, the insulating layer and the coverlayer expand at approximately the same rates, with the result being that the flexible circuit ideally does not bend significantly either upward or downward as the humidity changes.

In a fifth embodiment, the suspended portion of the flexible circuit has patches of additional hygroscopic material added in selected places over the coverlayer, such that ideally that suspended portion experiences net zero bend, or close to net zero bend, as humidity increases.

In a sixth embodiment, the suspended portion of the flexible circuit has areas of the polyimide insulating layer removed in selected places.

Additionally, the suspended portion of the flexible circuit can include a narrow tether connecting the suspended portion of the flexible circuit to another portion of the suspension, such as the gimbal outrigger arm, also known as the gimbal arm, in order to reduce the freedom of relative vertical movement between the outrigger arms and the suspended portions of the flexible circuit, and hence reduce hygrothermal effects. In a preferred embodiment, the tether is the same polyimide material as the insulating layer, and the tether has a greater dimension in the traverse direction of the suspension than in the longitudinal direction of the suspension.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

BRIEF DESCRIPTION OF THE DRAWINGS

FIG. 4A is a bottom plan view of a gimbal and flexible circuit according to a first embodiment of the present invention;

FIG. 4B is a top plan view of the gimbal and flexible circuit of FIG. 4A;

FIGS. 5A and 5B are sectional views of the gimbal outrigger arm and flexible circuit of FIG. 4A taken along section line 5-5 in FIG. 4B, with FIG. 5A showing the hand side of suspended portion 134 of flexible circuit 130 in FIG. 4B, and FIG. 5B showing the right hand side of outrigger arm 114 in FIG. 4B, as both of those parts would appear when viewed from the cross section defined by section line 5-5;

FIG. 6A is a top plan view of a gimbal and flexible circuit according to a second embodiment;

FIG. 6B is a top plan view of the gimbal and flexible circuit of FIG. 6A;

FIGS. 7A and 7B are sectional views of the gimbal outrigger arm and flexible circuit of FIG. 6A taken along section line 7-7, with FIG. 7A showing the left hand side of suspended portion 234 of the flexible circuit FIG. 6A, and FIG. 7B showing the right hand side of outrigger arm 214 in FIG.

Figure 10:
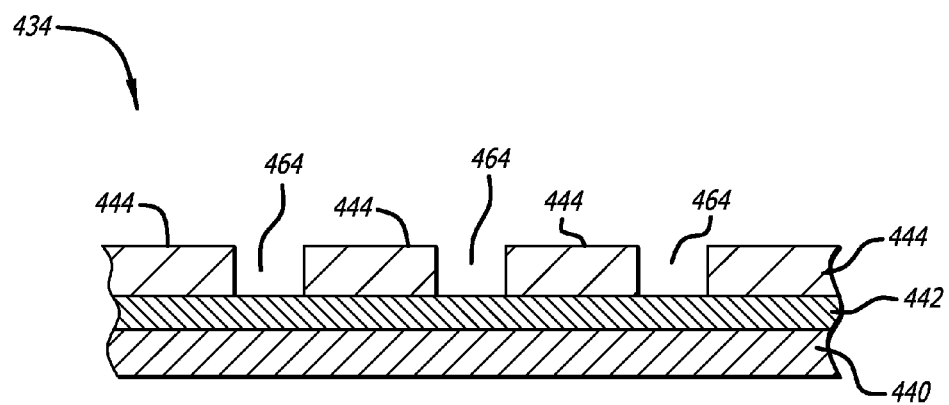
Figure 11:
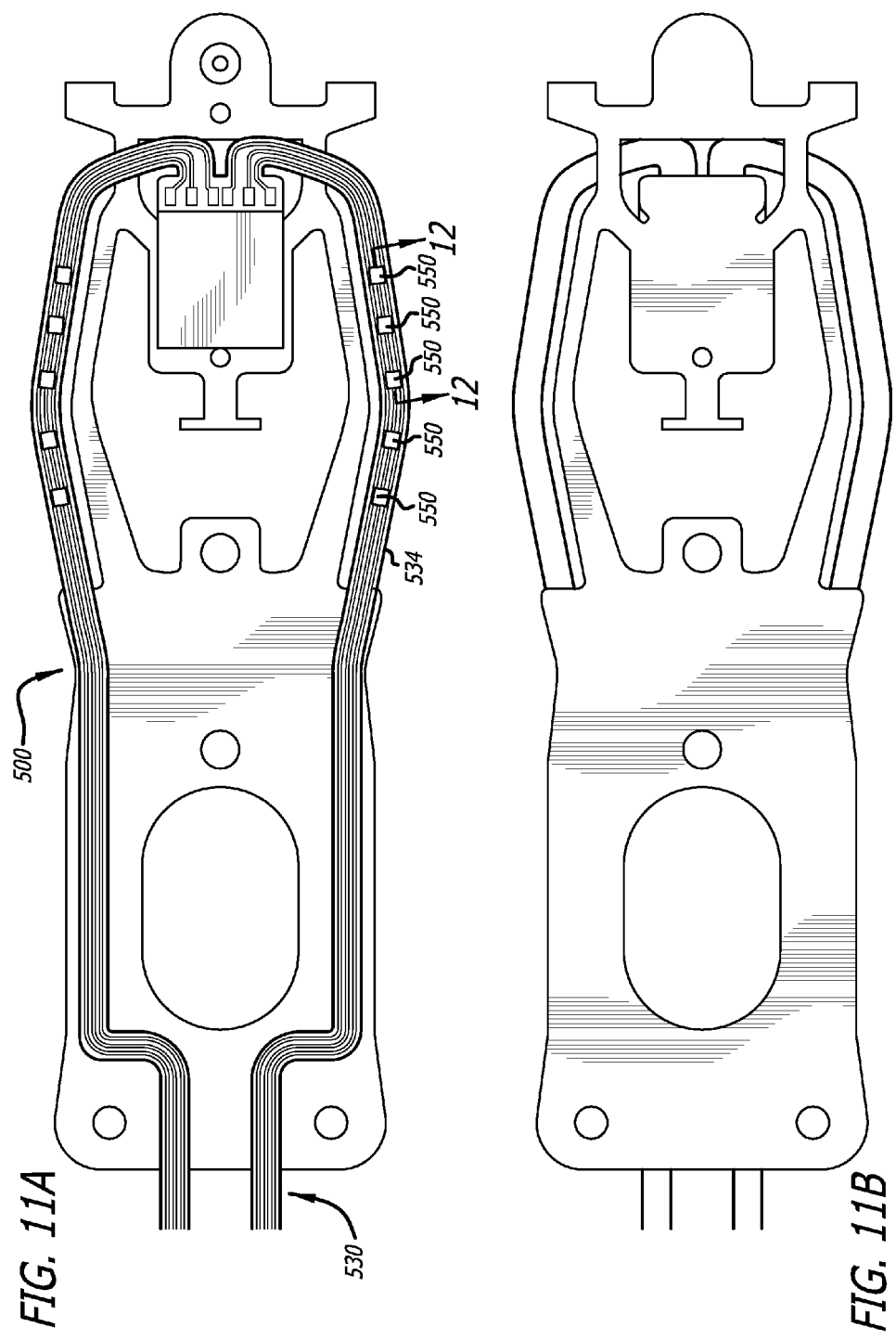
Figure 12:
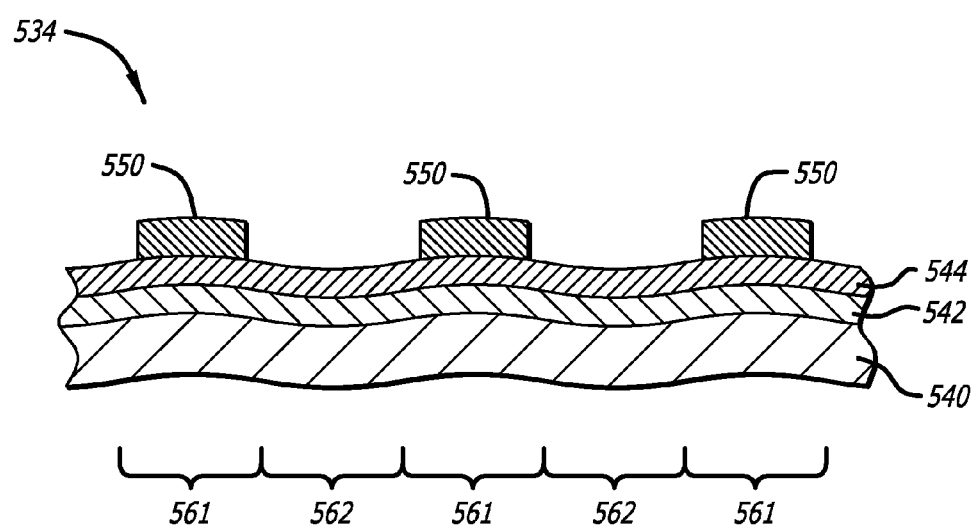

6A, as both of those parts would appear when viewed from the cross section defined by section line 7-7;

FIGS. 8A and 8B are sectional views of a gimbal outrigger arm and the suspended portion of a flexible circuit according to a third embodiment, taken along a cross sections similar to the views in FIGS. 7A and 7B;

FIG. 9A is a bottom plan view of a gimbal and flexible circuit according to a fourth embodiment of the present invention;

FIG. 9B is a top plan view of the gimbal and flexible circuit of FIG. 9A;

FIG. 10 is a sectional view of the gimbal outrigger arm and flexible circuit of FIG. 9A taken along section line 10-10;

FIG. 11A is a bottom plan view of a gimbal and flexible circuit according to a fifth embodiment of the present invention;

FIG. 11B is a top plan view of the gimbal and flexible circuit of FIG. 11A;

FIG. 12 is a sectional view of the gimbal outrigger arm and flexible circuit of FIG. 11A taken along section line 12-12;

FIG. 13A is a bottom plan view of a gimbal and flexible circuit according to a sixth embodiment of the present invention;

FIG. 13B is a top plan view of the gimbal and flexible circuit of FIG. 13A; and

Figure 14:
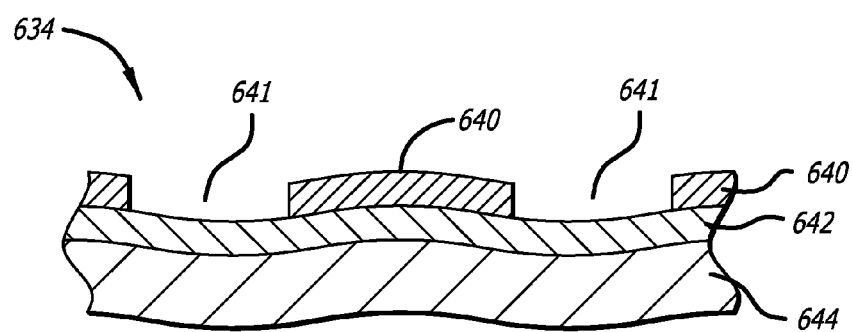

FIG. 14 is a sectional view of the gimbal outrigger arm and flexible circuit of FIG. 13A taken along section line 14-14 in FIG. 12B.

DETAILED DESCRIPTION OF THE PREFERRED EMBODIMENTS

In the invention and the embodiments thereof discussed below, the bending effect can theoretically be adjusted by adjusting the thicknesses of the added or removed layers. However, the thicknesses of the various suspension layers are often more or less determined or at least constrained by the manufacturing process used by the particular manufacturer. For example, it might be impractical to try to adjust the thickness of the stainless steel islands on the suspended portions of the flexible circuit, and/or impractical to try to adjust the thickness of the patches of polyimide on the outrigger arms. In such cases, rather than trying to control the amounts of bending by controlling the thicknesses of the layers, it may be more practical to adjust the amounts of bending by controlling where the added layers are located versus where the added layers are not located. This can be thought of as controlling the "duty cycle" of the added layers. For example, one could think of a length of suspended flexible circuit that has 30% of its bottom surface covered by stainless steel and 70% of its bottom surface not covered by stainless steel, with alternating regular patches of stainless steel and no stainless steel, as having a 30% duty cycle of stainless steel. Controlling the duty cycle of the stainless steel or the polyimide layers, rather than controlling the thicknesses of those layers, is currently believed to be generally more manufacturable due to it being generally easier to mask and etch away all of the stainless steel at a particular location than to etch the stainless steel down to only 30% of its original thickness, and to mask and etch away all of the polyimide or other material at a particular location than to etch that material down to only a percentage of its original thickness.

FIG. 4A is a bottom plan view of a flexure 100 and flexible circuit 130 according to a first embodiment of the present invention, and FIG. 4B is a top plan view of thereof. FIG. 5 is a section view taken along section line 5-5 in FIG. 4B. Flexure 100 includes a flexure backing layer 112 and a gimbal 110. Gimbal 110 includes two gimbal outrigger arms 114, or gimbal arms, and gimbal tongue 116 on which head slider 150, which includes read/write transducers, is mounted. Flexible circuit 130 is electrically connected to slider 150 by way of bonding pads 148. Typically, solder balls (not show) provide electrical contact between flexible circuit bonding pads 148 and corresponding bonding pads on slider 150.

Also shown is T-shaped limiter tab 118, which typically gets bent approximately 90° to form part of a slider travel limiting structure, the limiting structure helping to prevent the slider from being displaced excessively during an inertial event such as the disk drive being bumped. Limiter tab 118 thus cooperates to prevent damage to the disk surface during a shock event. Limiter tab 118 is not considered to be pertinent to the present invention, but is merely shown here as being a feature that is present in a typical suspension.

Flexible circuit 130 includes both a supported portion 132 and a suspended portion 134. Regardless of whether the suspension is manufactured using an additive process, or using a subtractive process, supported portion 132 is adhered to gimbal backing layer 112, which is typically stainless steel. An additive process involves beginning with a stainless steel support layer that defines or is patterned to define the flexure, then selectively adding an insulating layer, followed by copper or copper alloy signal traces, followed by an anti-corrosion layer of gold over the copper, and finally by a protective coverlayer. In contrast, a subtractive process begins with a flat sheet of laminate comprising stainless steel, an insulating layer, copper, gold, and a coverlayer. Areas of the laminate are then selectively removed at particular depths in order to define the desired flexure and circuit. Material may be removed by chemical etching, laser ablation, and other well known techniques. Both additive processes and subtractive processes for manufacturing flexure assemblies are well known in the art, and need not be discussed further. For simplicity of discussion, the invention will be described with reference to the gimbal and support layer being stainless steel; however, it will be recognized by those skilled in the art that the invention applies more generally to the use of non-hygroscopic materials other than stainless steel.

In suspensions to which the present invention is applicable, flexible circuit 130 includes suspended circuit portion 134 that is not directly adhered to gimbal arms 114. In the embodiment shown, suspended circuit portions 134 run generally parallel to corresponding adjacent gimbal arms 114.

As seen in FIG. 4B and FIG. 5, the top side of suspended portion 134 of flexible circuit 130 includes an insulating layer 140, at least one and typically three copper signal traces 142, and a protective coverlayer 144. Insulating layer 140 is typically an organic polymer such as polyimide. The thickness of the insulating layer is usually primarily driven by the need for the microstrip transmission lines defined by the copper traces, the polyimide, and the grounded stainless steel layer below in the supported portion 132, to have the correct impedance. Polyimide is a hygroscopic material; its coefficient of hygroscopic expansion is believed to be about 11 parts per million per percent change in relative humidity (ppm/% RH) to about 40 ppm/% RH. For simplicity of discussion, the invention will be described with reference to the insulating layer being polyimide; however, it will be recognized by those skilled in the art that the invention applies more generally to the use of hygroscopic materials other than polyimide.

Depending on the particular processes used to make the suspension, the coverlayers 144 in previous designs were typically modified acrylics or polyimide. It is generally desirable that the coverlayer be as thin as possible in order to avoid adding undesirable stiffness to the suspension. Typical thicknesses for the polyimide/copper/coverlayers in prior art suspensions are 10 μm/14 μm/4 μm, respectively.

Figure 1:
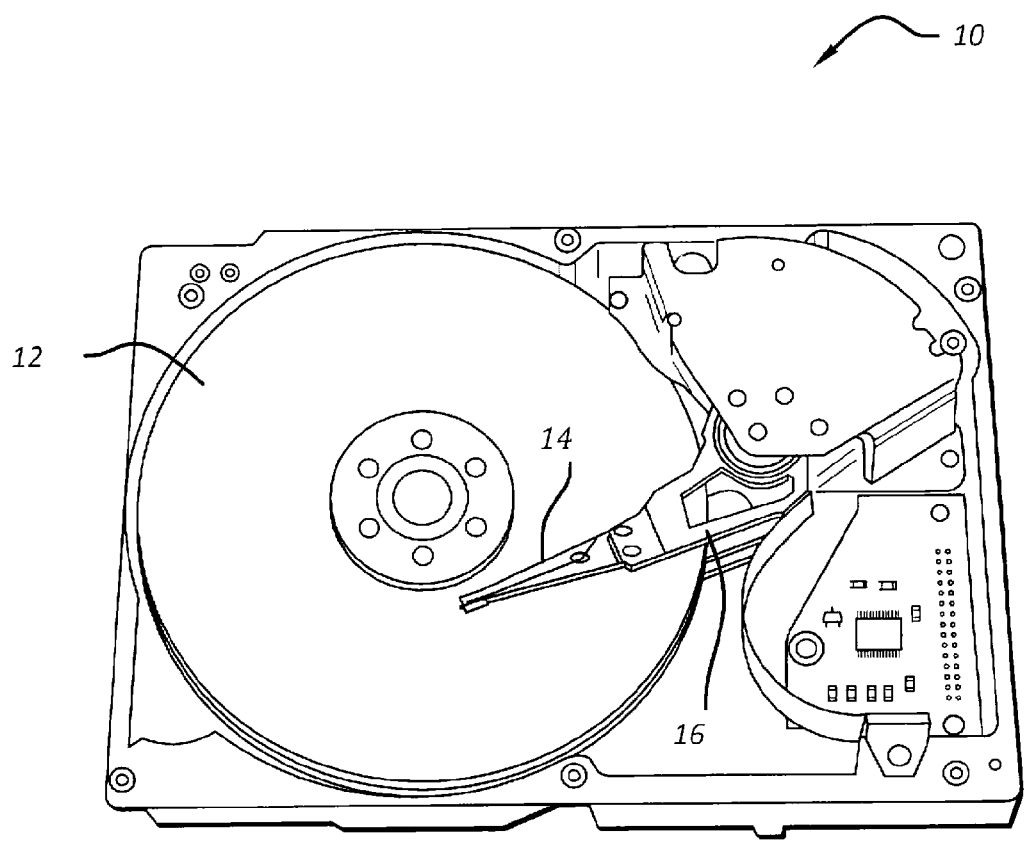
FIG. 1 is an oblique top view of a typical prior art disk drive assembly, and to which the present invention may be applied.
Figure 2:
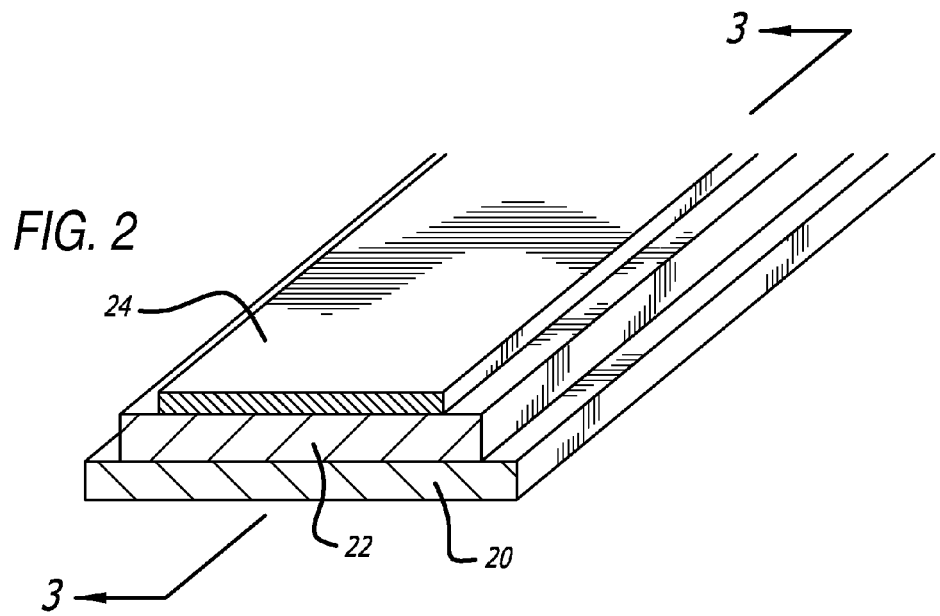
FIG. 2 is an oblique cutaway view of a laminate under a nominal humidity condition.
Figure 3A:
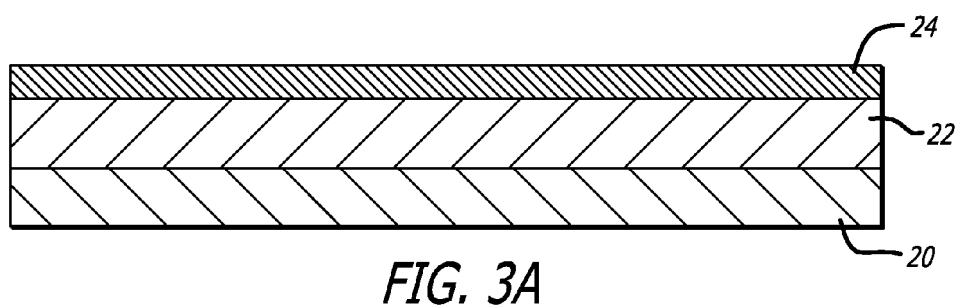
FIG. 3A is a cross-sectional view of the laminate of FIG. 2 taken along section line 3-3.
Figure 3B:
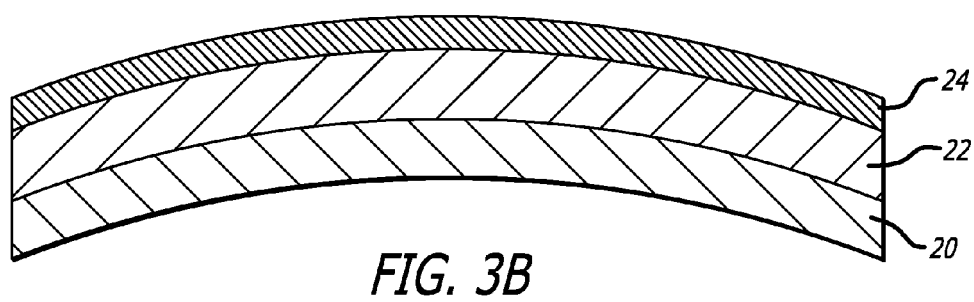
FIG. 3B is the laminate of FIG. 3A under a condition of increased humidity.

Due to the hygrothermal effects described above with respect to FIGS. 3A and 3B, in the absence of any compensation such as islands 136 whose function will be described shortly, as humidity increases, polyimide layer 140 would expand more than copper signal traces 142 and slightly more than coverlayer 144, causing unsupported portion 134 to bend downward (into a convex shape) from the perspective of FIG. 4B. This bending downward of both suspended circuit portions 134 would change the PSA of the suspension as measured at slider 150.

According to this first embodiment, however, compensation is provided by islands 136 of a non-hygroscopic material adhered to the insulating layer. This non-hygroscopic material defines a second non-hygroscopic material, with the first non-hygroscopic material being the material of which the gimbal 110 is comprised. In a preferred embodiment, the second non-hygroscopic material is the same material as the first non-hygroscopic material, and is stainless steel. With the islands 136 of non-hygroscopic material being stainless steel, those islands 136 can be included during fabrication of the suspension without additional manufacturing steps required. As seen from the perspective of FIG. 4B, suspended portion 134 of flexible circuit 130 will tend to bend or bow in a first direction upward at the ends (into a concave shape) at the locations where stainless steel islands 136 are present, and bend or bow in a second and opposite direction downward at the ends (into a convex shape) between islands 136. The bendings in opposite directions tend to cancel each other out as humidity changes. Ideally, the bendings in opposite directions completely cancel each other out, and the net effect is zero or approximately zero net bending and zero net change in PSA as measured at the slider. Realistically, the bendings cancelling each other out to within an accuracy of 10% to 20% as the humidity increases by 50% relative humidity, would be considered good results.

In the embodiment shown, stainless steel islands 136 are not integral to the stainless steel support layer that comprises flexure backing layer 112. Typically, stainless steel islands 136 would have originally been part of a flat sheet of stainless steel that was eventually etched to form the flexure, but the islands 136 would have been separated from flexure backing layer 112 and gimbal 110 by the same etching or other material removal step that was used to form gimbal 110 from the stainless steel sheet. Thus, islands 136 are no longer integral with the stainless steel support layer or other stainless steel parts of the flexure, and are not electrically connected thereto. Similarly, stainless steel islands 136 are not integral with each other, and are not electrically connected to each other. For purposes of this disclosure and the claims presented, describing islands 136 as being "not integral" or "not electrically connected" with the support layer or to each other, should be understood to mean that there is, at most, no more than insignificant thin threads or insignificant residual amounts of stainless steel material that connect islands 136 to other stainless steel portions of flexure 100 or to each other.

The invention is not limited in the number, size, or shape of stainless steel islands 136 on each suspended flexible circuit portion 134. Accordingly, the invention could include one relatively large island 136 on each of the left and right hand sides of the suspension, or two relatively large islands 136 on each half as shown, or a larger number of smaller islands.

FIGS. 6A-7 illustrate a second embodiment of the present invention. FIG. 6A is a bottom plan view of a flexure 200 and flexible circuit 230 according to this second embodiment, and FIG. 6B is a top plan view of thereof. FIG. 7 is a section view taken along section line 7-7 in FIG. 6B. In this embodiment, each of the gimbal outrigger arms has at least one respective patch of hygroscopic material adhered thereto. In flexure 200 as illustrated, each of outrigger arms 214 has two patches 235 of hygroscopic material. Preferably the patches 235 are of the same material as the insulating layer used in the flexible circuit 230 including its suspended portion 234, such that the insulating layer and the patches 235 can be formed at the same time.

In this embodiment, as humidity increases, the suspended portions 234 of flexible circuit 230 bend into a concave shape as seen from the bottom in FIG. 6A due to the fact that the polyimide insulating layer 240 expands more than does the copper signal conductors 242. At the same time, the outrigger arms tend to bend in the opposite direction, i.e, into a convex shape as seen from the bottom in FIG. 6A. The two bendings act in opposite directions, thus tending to cancel each other out.

In the figures, there are two isolated patches 235 of hygroscopic material on each outrigger arm 214, and the two patches are not directly connected to each other. There could be one, two, or more patches 235 on each outrigger arm. The number, dimensions, placements, and possibly even the materials of patches 235, are ideally selected so that the convex bending of the outrigger arms approximately cancels out the concave bending of the suspended portions 234 of flexible circuit 230, with the result being that the PSA of the suspension does not change appreciably despite the changing humidity, and despite changing temperature as well.

The added patches 235 are not part of flexible circuit 230, and are separate from it and from each other. Within this context, it will be understood that that to say that added patches 235 are not part of flexible circuit 230 means that no signal traces 242 lie over patches 235, and patches 235 do not contact and are not connected to flexible circuit 230 by any more than a trivial amount of hygroscopic insulating material. Similarly, to say that patches 235 are separated from each other means that patches 235 are not connected together via any of the hygroscopic material, or are connected together by, at most, a trivial amount of hygroscopic material.

FIG. 8 is a sectional view, similar to the sectional view of FIG. 7, of an outrigger arm and the suspended portion of a flexible circuit according to a third embodiment. In this embodiment, the suspended portion 334 of the flexible circuit is constructed with sufficient hygroscopic material 340, 344 of sufficient respective depths on respective opposite sides of copper conductors 342 such that those opposite sides expand approximately equally in response to increasing humidity and/or temperature. The result is that suspended portion 334 maintains an approximately zero bend over changes in humidity and temperature. In one implementation, both the insulating layer 340 and the coverlayer 344 comprise the same material such as polyimide, such that the coefficients of hygroscopic expansion of those two layers are the same, and the thickness $D_{IL}$ of the insulating layer approximately equals the average thickness $D_{CL}$ of the coverlayer, taking into account the fact that the coverlayer is thinner where it lies atop a copper signal trace 342. Preferably the insulating layer and the coverlayer expand equally to within 20%, and more preferably to within 10%, and more preferably still to within 5%, as the humidity increases by 50% relative humidity. More generally, the insulating layer and the coverlayer expand approximately the same amount.

When the insulating layer has a coefficient of hygroscopic expansion $HCE_{IL}$ and the coverlayer has a coefficient of hygroscopic expansion $HCE_{CL}$, then as a first approximation the ratio of $D_{IL}/D_{CL}$ is equal to the ratio of $CHE_{CL}/CHE_{IL}$ to within 20%, and more preferably still to within 10%, and more preferably still to within 5%, as the humidity increases by 50% relative humidity. Preferably the insulating layer and the coverlayer are the same material, or at least have the same coefficients of hygrothermal expansion to within about 20%, i.e., the ratio of $CHE_{CL}/CHE_{IL}$ is within the range of 0.8-1.2, and the ratio of $D_{IL}/D_{CL}$ is within the range of 0.8-1.2, and more preferably within the range of 0.9-1.1. If the polyimide insulating layer is approximately 10 μm thick as in a representative prior art suspension, then the coverlayer would also be approximately 10 μm thick in average thickness if it is also polyimide. Although increasing the thickness of the coverlayer makes for a stiffer flexible circuit, which is by itself a disadvantage, the modified circuit will have the advantage of less change in PSA over changes in temperature and humidity.

FIGS. 9A-10 illustrate a fourth embodiment of the present invention. FIG. 9A is a bottom plan view of a flexure 400 and flexible circuit 430 according to this second embodiment, and FIG. 9B is a top plan view of thereof. FIG. 10 is a section view taken along section line 10-10 in FIG. 9B. In this embodiment, the coverlayer 444 is selectively removed in one, two, or more areas 446. In other words, the coverlayer has, as measured along the length of copper signal trace 442, multiple and alternating areas of greater thickness and lesser thickness. In the embodiment shown, the areas of lesser thickness are areas having substantially zero coverlayer. The coverlayer may be removed in the selected areas by chemical etching, laser ablation, photodefinable polyimides, plasma etching, or other known techniques, which techniques can also be used to selectively remove polyimide and/or stainless steel in the other embodiments disclosed herein. It is believed that completely removing the coverlayer in selected areas will be easier from a manufacturing standpoint than selectively merely thinning the coverlayer. The result of the selective partial or complete removal the coverlayer is that the suspended portion 434 has less of a tendency to bow downward at the ends as viewed in FIG. 10 than if the coverlayer were left intact.

This embodiment would typically be used in suspended portions of a suspension which would otherwise bow downward at the ends as viewed in FIG. 10, such as when the polyimide layer 440 is thinner and/or has a smaller coefficient of hygroscopic expansion than does coverlayer 444. In areas where the copper signal trace 442 is exposed due to the selective removal of coverlayer 444, the copper would normally be covered by a thin anti-corrosive layer of gold (not shown) which will protect the copper trace from corrosion even in removed areas 446.

FIGS. 11A-12 illustrate a fifth embodiment of the present invention. FIG. 11A is a bottom plan view of a flexure 500 and flexible circuit 530 according to this second embodiment, and FIG. 11B is a top plan view of thereof. FIG. 12 is a section view taken along section line 12-12 in FIG. 11B. In this embodiment, polyimide insulating layer 540 is thicker and/or has a greater coefficient of expansion than coverlayer 544 which overlies copper signal trace 542; consequently, in order to compensate, additional patches 550 of hygroscopic material are added on top of normal coverlayer 544. Added patches 550 may be of the same material as coverlayer 544 and therefore have the same coefficient of hygroscopic expansion, may be a different hygroscopic material having a different coefficient of hygroscopic expansion than either the coverlayer 544 and possibly even the insulting layer 540. As humidity increases, the flexible circuit will have a tendency to bow downward in the areas 561 in which hygroscopic patches 550 have been added, and will have a tendency to bow upward in the areas 562 that do not have patches 550. Ideally, the flexible circuit will have zero net bending, or close to zero net bending as humidity changes. It will be understood that, as in the embodiment of FIGS. 11A-12, the embodiments of FIGS. 4A-10 also will have alternating areas of the circuit that tend to bow upward and downward, with the net result ideally being zero or close to zero net bending in response to changes in humidity and/or temperature.

FIGS. 13A-14 illustrate a sixth embodiment of the present invention. FIG. 13A is a bottom plan view of a flexure 600 and flexible circuit 630 according to this second embodiment, and FIG. 13B is a top plan view of thereof. FIG. 14 is a section view taken along section line 14-14 in FIG. 13B. As in the previous embodiment, polyimide insulating layer 640 is thicker and/or has a greater coefficient of expansion than coverlayer 644 which overlies copper signal trace 642. In this embodiment, however, in order to compensate the polyimide insulating layer 640 is selectively removed in areas 641. In other words, the insulating 640 has, as measured along the length of copper signal trace 642, multiple and alternating areas 643 of greater thickness and areas 641 of lesser thickness.

In the embodiment shown, the areas of lesser thickness are areas having substantially zero coverlayer. It is believed that completely removing insulating layer 640 in selected removal areas 641 will be easier from a manufacturing standpoint than selectively merely thinning the insulating layer 640. The result of the selective partial or complete removal the insulating layer is that the suspended portion 634 of the flexible circuit has less of a tendency to bow downwards at the ends as viewed in FIG. 14 than if the insulating layer 640 were left intact.

Engineering models were constructed of embodiments of the invention, and the models' performance under simulated humidity conditions were analyzed. The table below presents the resulting simulation data obtained.

TABLE 1

| | Simulation Data | | |
|---|---|---|---|
| Embodiment | Modeled PSA Change (degrees) | Gimbal Pitch Stiffness $K_P$ (μNM/deg) | Gimbal Roll Stiffness $K_R$ (μNM/deg) |
| Nominal Design | 0.093 | 0.60 | 0.64 |
| 1 (FIGS. 4A-5) | 0.054 | 0.67 | 0.66 |
| 2 (FIGS. 6A-7) | 0.047 | 0.63 | 0.66 |
| 3 (FIG. 8) | 0.008 | — | — |
| 4 (FIGS. 9A-10) | 0.070 | — | — |

In the simulation, the insulating layer and the coverlayer were modeled using a coefficient of hygroscopic expansion (CHE) of 12 ppm/% RH. The third embodiment was simulated using a 5 μm insulating layer, and a 4 μm thick coverlayer. The values above compare to typical values of $K_P$=0.4-0.6 μNM/deg, and $K_R$=0.5-0.7 μNM/deg. It is believed that typical values of CHE for various insulating materials used in suspensions range from about 11 ppm/% RH to about 40 ppm/% RH. The actual changes in PSA shown in the table may therefore be on the conservative side, due to typical CHE for insulating material used in suspensions probably being somewhat higher than the figure of 12 ppm/% RH used in the model.

The data in Table 1 shows that all of the embodiments of the invention as modeled showed significant improvement in PSA stability over changing humidity conditions, as compared to the nominal design (the same suspension but without the various compensation mechanisms disclosed herein). In the third embodiment, the PSA change over humidity was reduced to about 9% of what the PSA change had been in the nominal design. The present invention is therefore of a suspension having a significantly more stable PSA over humidity. Similar improvements would be expected in PSA stability over changing temperature.

It will be understood that the terms "generally," "approximately," "about," and "substantially," as used within the specification and the claims herein allow for a certain amount of variation from any exact dimensions, measurements, and arrangements, and that those terms should be understood within the context of the description and operation of the invention as disclosed herein.

It will further be understood that terms such as "top," "bottom," "above," and "below" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A disk drive suspension whose pitch static attitude (PSA) has an improved resistance to environmental changes, the suspension comprising:
   a load beam and a gimbal mounted thereto;
   the gimbal having two metal gimbal outrigger arms supporting a gimbal tongue on which a transducer head is mounted;
   a flexible circuit electrically connected to the transducer head, the flexible circuit comprising an insulating layer, at least one metal signal trace on the insulating layer, and a protective cover layer on the metal signal trace;
   the flexible circuit having a top and a bottom surface, and having:
      a first and supported portion extending over and supported on its bottom surface by a support layer, the support layer comprising a first non-hygroscopic material; and
      two suspended circuit portions that are not supported on their bottom surfaces by said support layer;
   wherein the improvement comprises:
   on each suspended circuit portion, two unconnected patches of a second non-hygroscopic material adhered on the bottom surfaces thereof in areas in which the suspended circuit portion extends alongside a respective metal gimbal outrigger arm.

2. The suspension of claim 1 wherein said second non-hygroscopic material is not integral with said support layer.

3. The suspension of claim 2 wherein said second non-hygroscopic material comprises a plurality of islands that are not integral with said support layer.

4. The suspension of claim 3 wherein said islands are islands of metal that are not electrically connected with each other.

5. The suspension of claim 1 wherein said support layer comprises stainless steel, and said second non-hygroscopic material comprises stainless steel.

6. The suspension of claim 5 wherein said second non-hygroscopic material comprises stainless steel that is not integral with the support layer.

7. The suspension of claim 1 wherein:
   said second non-hygroscopic material causes the suspended flexible circuit portion having said second non-hygroscopic material on its bottom surface to bow in a first direction in responses to increased humidity; and
   the suspended flexible circuit portion that does not have said second non-hygroscopic material on its bottom surface bows in a second direction in response to increased humidity, the second direction being opposite from the first direction such that the two bowings are in opposite directions thereby tending to cancel each other out and thus reduce PSA changes in the suspension due to changes in humidity.

8. A disk drive suspension whose pitch static attitude (PSA) has an improved resistance environmental changes, the suspension comprising:
   a load beam and a gimbal mounted thereto;
   the gimbal having two metal gimbal outrigger arms supporting a gimbal tongue on which a transducer head is mounted;
   a flexible circuit electrically connected to the transducer head, the flexible circuit comprising an insulating layer, at least one metal signal trace on the insulating layer, and a protective cover layer on the metal signal trace;
   the flexible circuit having a top and a bottom surface, and having:
      a first and supported portion extending over and supported on its bottom surface by a support layer, the support layer comprising a first non-hygroscopic material; and
      two suspended circuit portions that are not suspended on their bottom surfaces by said support layer, the suspended circuit portions each comprising an insulating layer, a signal conductor thereon, and a cover layer over the signal conductor;
   wherein the improvement comprises at least one of:
      (a) a plurality of patches of stainless steel material on each of said suspended flexible circuit portions in areas in which the suspended flexible circuit portion extend alongside respective ones of the metal gimbal outrigger arms;

(b) each of the metal gimbal outrigger arms has a plurality of patches of polyimide adhered thereto, the patches not being part of the flexible circuit;

(c) wherein relative thicknesses of each of the suspended circuit portion's insulating layer and cover layer are such that as humidity increases, the insulating layer and the cover layer expand approximately the same amount; and (d) on each of the flexible circuit suspended portions, at least one of the insulating layer and the cover layer has a repeating plurality of alternating areas of greater thickness and lesser thickness as measured along a length of the metal signal trace.

9. The suspension of claim 8 wherein the patches of stainless steel material are electrically isolated from each other, and the patches of polyimide are isolated from each other.

10. The suspension of claim 8 wherein the relative thicknesses of the suspended portion's insulating layer and the cover layer are such that as relative humidity increases by 50%, a difference in expansions of the insulating layer and the cover layer do not exceed 20%.

11. The suspension of claim 8 wherein the improvement comprises (a), and the patches of stainless steel material are electrically isolated from each other.

12. The suspension of claim 8 wherein:
said suspended flexible circuit portion having said stainless steel patches thereon bows in a first direction in responses to increased humidity; and
the suspended flexible circuit portion that does not have said stainless steel patches thereon bows in a second direction in response to increased humidity, the second direction being opposite from the first direction such that the two bowings are in opposite directions thereby tending to cancel each other out and thus reduce PSA changes in the suspension due to changes in humidity.

13. A disk drive suspension whose pitch static attitude (PSA) has an improved resistance to environmental changes, the suspension comprising:
a load beam and a gimbal mounted thereto;
the gimbal having gimbal outrigger arms supporting a gimbal tongue on which a transducer head is mounted;
a flexible circuit electrically connected to the transducer head, the flexible circuit comprising an insulating layer, at least one metal signal trace on the insulating layer, and a protective cover layer on the metal signal trace;
the flexible circuit having a top and a bottom surface, and having:
a first and supported portion extending over and supported on its bottom surface by a support layer, the support layer comprising a first non-hygroscopic material; and
a second and suspended portion that is not supported on its bottom surface by said support layer;
wherein the improvement comprises:
a plurality of metal patches on the bottom surface of said suspended flexible circuit portion, the patches being disposed in areas where the suspended flexible circuit portion extends alongside one of said gimbal outrigger arms, the metal patches being selected and arranged so as to minimize bowing of said suspended flexible circuit portions as humidity changes.

* * * * *

UNITED STATES PATENT AND TRADEMARK OFFICE
CERTIFICATE OF CORRECTION

PATENT NO. : 8,441,761 B1
APPLICATION NO. : 12/983613
DATED : May 14, 2013
INVENTOR(S) : Peter Hahn, Keat Chai and Kuen Chee Ee It is certified that error appears in the above-identified patent and that said Letters Patent is hereby corrected as shown below:

In the Claims:

In claim 8, column 12, line 41, after "resistance" insert --to--.

In claim 8, column 12, line 57, after "not" delete "suspended" and insert --supported--.

In claim 8(a), column 12, line 65, delete "portion" and insert --portions--.

Signed and Sealed this
Twenty-fifth Day of June, 2013

Teresa Stanek Rea
*Acting Director of the United States Patent and Trademark Office*